US008756103B1

(12) United States Patent
Amidon et al.

(10) Patent No.: US 8,756,103 B1
(45) Date of Patent: Jun. 17, 2014

(54) SYSTEM AND METHOD OF IMPLEMENTING ALTERNATIVE REDEMPTION OPTIONS FOR A CONSUMER-CENTRIC ADVERTISING SYSTEM

(75) Inventors: Christopher Amidon, Apex, NC (US); Gregory Evans, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 999 days.

(21) Appl. No.: 11/692,442

(22) Filed: Mar. 28, 2007

(51) Int. Cl.
*G06Q 30/00* (2012.01)

(52) U.S. Cl.
USPC .............. 705/14.4; 705/14.49; 705/14.66

(58) Field of Classification Search
USPC ............... 705/14, 14.4, 14.49, 14.66
See application file for complete search history.

(56) References Cited

U.S. PATENT DOCUMENTS

| | | | |
|---|---|---|---|
| 4,775,935 A | 10/1988 | Yourick | |
| 5,155,591 A | 10/1992 | Wachob | |
| 5,231,494 A | 7/1993 | Wachob | |
| 5,404,393 A | 4/1995 | Remillard | |
| 5,534,911 A | 7/1996 | Levitan | |
| 5,557,721 A | 9/1996 | Fite et al. | |
| 5,636,346 A | 6/1997 | Saxe | |
| 5,664,948 A | 9/1997 | Dimitriadis et al. | |
| 5,724,521 A | 3/1998 | Dedrick | |
| 5,740,549 A | 4/1998 | Reilly et al. | |
| 5,794,207 A | 8/1998 | Walker et al. | |
| 5,794,210 A | 8/1998 | Goldhaber et al. | |
| 5,855,008 A | 12/1998 | Goldhaber, III et al. | |
| 5,933,811 A | 8/1999 | Angles et al. | |
| 5,959,623 A | 9/1999 | van Hoff et al. | |
| 5,974,398 A * | 10/1999 | Hanson et al. | 705/14 |
| 5,983,214 A | 11/1999 | Lang et al. | |
| 5,995,943 A | 11/1999 | Bull et al. | |
| 6,025,837 A | 2/2000 | Matthews, III et al. | |
| 6,081,278 A | 6/2000 | Chen | |
| 6,112,186 A | 8/2000 | Bergh et al. | |
| 6,134,532 A | 10/2000 | Lazarus et al. | |
| 6,240,555 B1 | 5/2001 | Shoff et al. | |
| 6,324,519 B1 * | 11/2001 | Eldering | 705/14 |

(Continued)

FOREIGN PATENT DOCUMENTS

| | | |
|---|---|---|
| EP | 0 989 722 A1 | 9/1999 |
| EP | 1 190 579 B1 | 8/2000 |

(Continued)

OTHER PUBLICATIONS

No Author, "Virtual World—Wikipedia," (website), obtained Sep. 21, 2007, 3 pages, http://en.wikipedia.org/wiki/Virtual_world.

(Continued)

*Primary Examiner* — Michael Bekerman
*Assistant Examiner* — Mario C Iosif
(74) *Attorney, Agent, or Firm* — Withrow & Terranova, PLLC (57) ABSTRACT

A narrowcast advertising system includes a centralized late binding application (LBA) that communicates with one or more respective LBA device components on destination devices associated with a given consumer. The LBA application receives a plurality of advertisements in accordance with ad contracts negotiated between a consumer and an advertising entity. Selected ads are distributed to the respective destination devices for integration with accessible content. Confirmation indications are received by the LBA application from the destination devices so that contract fulfillment records can be updated in accordance with the various options a consumer has for satisfying the negotiated contract.

33 Claims, 6 Drawing Sheets

(56) References Cited

U.S. PATENT DOCUMENTS

| | | |
|---|---|---|
| 6,329,986 B1 | 12/2001 | Cheng |
| 6,446,261 B1 | 9/2002 | Rosser |
| 6,456,286 B1 | 9/2002 | Arai et al. |
| 6,496,857 B1 | 12/2002 | Dustin et al. |
| 6,519,571 B1 | 2/2003 | Guheen et al. |
| 6,574,793 B1 | 6/2003 | Ngo et al. |
| 6,698,020 B1 | 2/2004 | Zigmond et al. |
| 6,718,551 B1 | 4/2004 | Swix et al. |
| 6,738,978 B1 | 5/2004 | Hendricks et al. |
| 6,758,746 B1 | 7/2004 | Hunter et al. |
| 6,799,326 B2 | 9/2004 | Boylan, III et al. |
| 6,820,277 B1 | 11/2004 | Eldering et al. |
| 6,954,728 B1 | 10/2005 | Kusumoto et al. |
| 6,973,436 B1 | 12/2005 | Shkedi |
| 6,983,478 B1 | 1/2006 | Grauch et al. |
| 6,985,882 B1 | 1/2006 | Del Sesto |
| 6,985,966 B1 | 1/2006 | Gupta et al. |
| 7,039,932 B2 | 5/2006 | Eldering |
| 7,043,746 B2 | 5/2006 | Ma |
| 7,065,550 B2 | 6/2006 | Raghunandan |
| 7,085,732 B2 * | 8/2006 | Gould .................. 705/14.71 |
| 7,099,331 B2 | 8/2006 | Taylor |
| 7,100,183 B2 | 8/2006 | Kunkel et al. |
| 7,134,132 B1 | 11/2006 | Ngo et al. |
| 7,136,871 B2 | 11/2006 | Ozer et al. |
| 7,146,627 B1 | 12/2006 | Ismail et al. |
| 7,155,210 B2 | 12/2006 | Benson |
| 7,158,959 B1 | 1/2007 | Chickering et al. |
| 7,228,555 B2 | 6/2007 | Schlack |
| 7,386,512 B1 | 6/2008 | Allibhoy et al. |
| 7,652,594 B2 | 1/2010 | Lamont et al. |
| 2001/0049620 A1 | 12/2001 | Blasko |
| 2001/0056577 A1 | 12/2001 | Gordon et al. |
| 2002/0002488 A1 | 1/2002 | Muyres et al. |
| 2002/0004744 A1 | 1/2002 | Muyres et al. |
| 2002/0007488 A1 | 1/2002 | Kikinis et al. |
| 2002/0013757 A1 | 1/2002 | Bykowsky et al. |
| 2002/0019769 A1 | 2/2002 | Barritz et al. |
| 2002/0019774 A1 | 2/2002 | Kanter |
| 2002/0046084 A1 | 4/2002 | Steele et al. |
| 2002/0046099 A1 | 4/2002 | Frengut et al. |
| 2002/0059094 A1 | 5/2002 | Hosea et al. |
| 2002/0083441 A1 | 6/2002 | Flickinger et al. |
| 2002/0087402 A1 | 7/2002 | Zustak et al. |
| 2002/0092017 A1 | 7/2002 | Klosterman et al. |
| 2002/0095333 A1 | 7/2002 | Jokinen et al. |
| 2002/0099606 A1 | 7/2002 | Shlagman |
| 2002/0113820 A1 | 8/2002 | Robinson et al. |
| 2002/0120506 A1 | 8/2002 | Hagen |
| 2002/0129368 A1 | 9/2002 | Schlack et al. |
| 2002/0138291 A1 | 9/2002 | Vaidyanathan et al. |
| 2002/0138440 A1 | 9/2002 | Vaidyanathan et al. |
| 2002/0152117 A1 | 10/2002 | Cristofalo et al. |
| 2002/0178445 A1 | 11/2002 | Eldering et al. |
| 2002/0178447 A1 | 11/2002 | Plotnick et al. |
| 2002/0184047 A1 | 12/2002 | Plotnick et al. |
| 2002/0194215 A1 | 12/2002 | Cantrell et al. |
| 2002/0198746 A1 | 12/2002 | Bending |
| 2003/0004793 A1 | 1/2003 | Feuer et al. |
| 2003/0005439 A1 | 1/2003 | Rovira |
| 2003/0008613 A1 * | 1/2003 | Karr et al. .................... 455/11.1 |
| 2003/0023489 A1 | 1/2003 | McGuire et al. |
| 2003/0067554 A1 | 4/2003 | Klarfeld et al. |
| 2003/0101449 A1 | 5/2003 | Bentolila et al. |
| 2003/0114146 A1 | 6/2003 | Benson |
| 2003/0115597 A1 | 6/2003 | Yassin et al. |
| 2003/0139966 A1 | 7/2003 | Sirota et al. |
| 2003/0149975 A1 * | 8/2003 | Eldering et al. ............... 725/34 |
| 2003/0154475 A1 * | 8/2003 | Rodriguez et al. ............. 725/32 |
| 2003/0226142 A1 | 12/2003 | Rand |
| 2003/0231854 A1 | 12/2003 | Derrenberger |
| 2004/0003398 A1 | 1/2004 | Donian et al. |
| 2004/0025174 A1 | 2/2004 | Cerrato |
| 2004/0073924 A1 | 4/2004 | Pendakur |
| 2004/0107437 A1 | 6/2004 | Reichardt et al. |
| 2004/0111742 A1 | 6/2004 | Hendricks et al. |
| 2004/0133512 A1 * | 7/2004 | Woolston .................. 705/39 |
| 2004/0139025 A1 | 7/2004 | Coleman |
| 2004/0148625 A1 | 7/2004 | Eldering et al. |
| 2004/0162759 A1 | 8/2004 | Willis |
| 2004/0193484 A1 | 9/2004 | Allen |
| 2004/0213542 A1 * | 10/2004 | Hamasaka et al. ............... 386/46 |
| 2004/0215568 A1 * | 10/2004 | Fukushima et al. ............ 705/51 |
| 2005/0033641 A1 | 2/2005 | Jha et al. |
| 2005/0039205 A1 | 2/2005 | Riedl |
| 2005/0049919 A1 | 3/2005 | Disterdick |
| 2005/0086605 A1 | 4/2005 | Ferrer et al. |
| 2005/0091109 A1 | 4/2005 | Howard et al. |
| 2005/0091111 A1 | 4/2005 | Green et al. |
| 2005/0091160 A1 | 4/2005 | Kitze et al. |
| 2005/0097059 A1 | 5/2005 | Plotnick et al. |
| 2005/0108776 A1 * | 5/2005 | Carver et al. .................. 725/135 |
| 2005/0137958 A1 | 6/2005 | Huber et al. |
| 2005/0138658 A1 | 6/2005 | Bryan |
| 2005/0165638 A1 | 7/2005 | Piller |
| 2005/0171832 A1 | 8/2005 | Hull et al. |
| 2005/0177385 A1 | 8/2005 | Hull et al. |
| 2005/0188402 A1 | 8/2005 | de Andrade et al. |
| 2005/0216346 A1 | 9/2005 | Kusumoto et al. |
| 2005/0283796 A1 | 12/2005 | Flickinger |
| 2006/0015904 A1 | 1/2006 | Marcus |
| 2006/0026067 A1 | 2/2006 | Nicholas et al. |
| 2006/0036490 A1 | 2/2006 | Sagalyn |
| 2006/0085254 A1 * | 4/2006 | Grim et al. ..................... 705/14 |
| 2006/0095507 A1 | 5/2006 | Watson |
| 2006/0100923 A1 | 5/2006 | Courchesne |
| 2006/0100928 A1 | 5/2006 | Walczak, Jr. et al. |
| 2006/0107302 A1 | 5/2006 | Zdepski |
| 2006/0111979 A1 | 5/2006 | Chu |
| 2006/0123448 A1 | 6/2006 | Ma et al. |
| 2006/0128469 A1 | 6/2006 | Willis et al. |
| 2006/0135232 A1 | 6/2006 | Willis |
| 2006/0135732 A1 | 6/2006 | Yeager |
| 2006/0155597 A1 | 7/2006 | Gleason |
| 2006/0168616 A1 | 7/2006 | Candelore |
| 2006/0200434 A1 | 9/2006 | Flinn et al. |
| 2006/0212350 A1 | 9/2006 | Ellis et al. |
| 2006/0212900 A1 | 9/2006 | Ismail et al. |
| 2006/0253323 A1 | 11/2006 | Phan et al. |
| 2006/0287915 A1 | 12/2006 | Boulet et al. |
| 2006/0288362 A1 | 12/2006 | Pulton, Jr. et al. |
| 2006/0293954 A1 | 12/2006 | Anderson et al. |
| 2007/0011050 A1 * | 1/2007 | Klopf et al. ..................... 705/14 |
| 2007/0015531 A1 | 1/2007 | Disalvo |
| 2007/0033107 A1 | 2/2007 | Ubale et al. |
| 2007/0061204 A1 | 3/2007 | Ellis et al. |
| 2007/0073614 A1 | 3/2007 | Jung et al. |
| 2007/0150537 A1 * | 6/2007 | Graham ..................... 709/203 |
| 2007/0299743 A1 | 12/2007 | Staib et al. |

FOREIGN PATENT DOCUMENTS

| | | |
|---|---|---|
| EP | 1182879 | 2/2001 |
| EP | 1162840 | 12/2001 |
| WO | WO 99/52285 A2 | 4/1999 |
| WO | WO 00/61465 A1 | 4/2000 |
| WO | WO 0107985 | 2/2001 |
| WO | WO 0111882 | 2/2001 |
| WO | WO 0152541 | 7/2001 |
| WO | WO 0182597 | 11/2001 |
| WO | WO 0219581 | 3/2002 |
| WO | WO 03063041 | 7/2003 |
| WO | WO 2004/003879 A2 | 1/2004 |
| WO | WO 2004/049226 A1 | 6/2004 |
| WO | WO 2004064042 | 7/2004 |
| WO | WO 2005/065190 A2 | 7/2005 |
| WO | WO 2006127645 | 11/2006 |
| WO | WO 2006135981 | 12/2006 |

OTHER PUBLICATIONS

No Author, "Ajax3D.org—The Open Platform for Rich 3D Web Applications," (website), obtained Sep. 21, 2007, 1 page, http://www.ajax3d.org/.

(56) References Cited

OTHER PUBLICATIONS

No Author, "Diverse—Device Independent Virtual Environments," (website), obtained Sep. 21, 2007, 2 pages, http://www.diverse-vr.org.

No Author, "Multiverse," (website), obtained Sep. 21, 2007, 1 page, http://www.multiverse.net/.

No Author, "Visible World: About Us," (website), obtained Sep. 21, 2007, 1 page, http://www.visibleworld.com/about/.

Thomas E. Truman et al., "The InfoPad Multimedia Terminal: A Portable Device for Wireless Information Access," (article), Oct. 1998, pp. 1073-1087, Transactions on Computers, vol. 47, Issue 10, Abstract only, http://csdl2.computer.org/persagen/DLAbsToc.jsp?resourcePath=/dl/trans/tc/&toc=comp/trans/tc/1998/10/txtoc.xml&DOI=10.1109/12.729791.

Robert Brodersen, "InfoPad an Experiment in System Level Design and Integration," (article), 1997, 2 pages, Dept. of EECS University of California, Berkeley, Proceedings of the 34th Annual Conference on Design Automation.

http://www.priorartdatabase.com/IPCOM/000138556/ publication date unknown.

Evans et al., U.S. Appl. No. 11/678,261, filed Feb. 23, 2007, "Auction-Based Advertising Including Consumer-Solicited Ad Distribution".

Olaiya et al. U.S. Appl. No. 11/737,406, filed Apr. 19, 2007, "Enhanced Ad Provision in a Consumer Auction-Based Advertising System".

\* cited by examiner

SYSTEM AND METHOD OF IMPLEMENTING ALTERNATIVE REDEMPTION OPTIONS FOR A CONSUMER-CENTRIC ADVERTISING SYSTEM

FIELD OF THE INVENTION

The present invention relates generally to advertising, including methods and systems that provide for targeted advertising from multiple sources to multiple consumer devices based on profile information.

BACKGROUND OF THE INVENTION

In the traditional broadcast model, content providers, such as television networks and stations, cable television providers, and satellite television providers, sell advertising opportunities on the basis of audience size. For example, a thirty second advertising slot in a widely-viewed television program typically sells for more money than a thirty-second advertising slot in a less popular program. However, due to the dependence of advertising value on audience size, advertising is typically tailored to appeal to the broadest possible audience. Unfortunately, due to disparate tastes amongst viewers, it is uncommon for an advertisement to appeal to all viewers.

Several attempts have been made to adopt a "narrowcasting" model whereby content and advertising are more closely tailored to the viewing audience. For instance, viewing patterns and other consumer profiling information may be gathered, e.g., by a cable television provider. Based on the profiling information, the cable television provider can offer targeted advertising opportunities. Different advertisements may be presented to different groups through the use of devices such as set-top boxes (STBs) that allow for late-binding of advertisements. For example, a first advertisement tailored to a first narrowcast group and a second advertisement tailored to a second narrowcast group may be distributed to each respective group. At the time for the advertisement (e.g. a commercial break), the respective tailored advertisements can be inserted into the programming.

Nonetheless, current narrowcasting models can suffer from several drawbacks. For instance, narrowcast advertising opportunities are typically more expensive for potential advertisers. Additionally, consumer sentiment with regard to the advertising remains unfavorable—many consumers still view advertising, even targeted advertising, as an imposition and/or annoyance. Therefore, a need remains for advertising models and implementations thereof that provide for more effective, economic, and enjoyable advertisements.

Furthermore, narrowcast advertising typically is employed to integrate advertisements into programming on a specifically identified device, such as a television, thus essentially providing a single channel for redeeming targeted ads. Such a configuration is inherently characterized by time, place and manner limitations pertaining to the presentation of advertisements to a given consumer. Therefore, a need remains for providing multiple targeted advertising redemption paths involving multiple ad distributors and multiple playback devices.

SUMMARY OF THE INVENTION

Objects and advantages of the present invention will be apparent to one of skill in the art upon careful review of the disclosure and/or practice of the subject matter. The objects and advantages include providing methods and systems for distributing targeted (and/or other) advertising in a way that can result in more effective and economical use of advertising resources. Additionally, through use of a consumer-centric model, negative sentiment with regard to advertising may be advantageously reduced. Still further, integration of targeted advertising with content on multiple destination devices achieves dynamic methods for a consumer to satisfy advertising contracts negotiated on the consumer's behalf and receive corresponding incentives.

Embodiments of the present subject matter include computer-based methods and systems for providing consumers the ability to sell advertising opportunities to potential advertisers. The present subject matter is consumer-centric, since the advertising opportunities are sold by the consumer rather than content providers, such as cable providers. Furthermore, the consumers themselves receive at least some of the benefit, such as a payment, discount, reward or other incentive, for selling advertising time. Contracts may be defined between a consumer and advertising entity as capable of being fulfilled in a plurality of different fashions since ad access may take place on one or more of a plurality of different destination devices, including but not limited to set top boxes, PC and/or laptop computers, cellular phones, telephones, televisions, PDAs, music players, digital photo frames/displays and other devices.

Integration of different ad versions into content played on the various destination devices is handled in part by a centralized late binding application (LBA) that communicates with one or more respective LBA device components on each destination device. The LBA application handles such aspects as ad selection and contract fulfillment based on centralized parameters and device specific configurations and operations. LBA device components respectively include a device specific user interface, ad insertion circuitry and buffer management functionality.

BRIEF DESCRIPTION OF THE SEVERAL VIEWS OF THE DRAWINGS

A full and enabling disclosure including the best mode of practicing the appended claims and directed to one of ordinary skill in the art is set forth more particularly in the remainder of the specification. The specification makes reference to the appended figures, in which:

Use of like reference numerals in different features is intended to illustrate like or analogous components.

DETAILED DESCRIPTION OF THE PREFERRED EMBODIMENTS

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The technology discussed herein makes reference to servers, databases, software applications, and/or other computer-based systems, as well as actions taken and information sent to and from such systems. One of ordinary skill in the art will recognize the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

When data is obtained or accessed between a first and second computer system or component thereof, the actual data may travel between the systems directly or indirectly. For example, if a first computer accesses a file or data from a second computer, the access may involve one or more intermediary computers, proxies, and the like. When file(s) or data are transferred between two computers, for instance, the actual file(s) or data may move between the computers, or one computer may provide a pointer or metafile that the other computer uses to access the actual data by going to one or more additional computers.

The present disclosure also makes reference to the relay of communicated data over a network such as the Internet. However, any suitable network or combination(s) of networks may be used. For instance, communications may occur over a dial-in network, a local area network (LAN), wide area network (WAN), public switched telephone network (PSTN), the Internet, intranet or other type(s) of networks. Network configurations may comprise any combination of hard-wired or wireless communication links.

The various computer systems discussed herein are not limited to any particular hardware architecture or configuration. Any suitable programming, scripting, or other type of language or combinations of languages may be used to implement the teachings contained herein. Embodiments of the methods and systems set forth herein may be implemented by one or more general-purpose or customized computing devices accessing software instructions rendered in a computer-readable form, which thus configure the computing devices to function as special purpose machines adapted to perform designated steps. Embodiments of the methods and systems set forth herein may also be implemented by hard-wired logic or other circuitry, including, but not limited to application-specific circuits. Of course, combinations of computer-executed software and hard-wired logic may be suitable, as well.

Embodiments of the methods disclosed herein may be executed by one or more suitable computing devices. Such devices may access one or more computer-readable media that embody computer-readable instructions which, when executed by at least one computer, cause the at least one computer to implement one or more embodiments of the methods disclosed herein. Furthermore, components of the presently-disclosed technology, such as knowledge bases and data stores, may be implemented using one or more computer-readable media.

Any suitable computer-readable medium or media may be used to implement or practice the presently-disclosed subject matter, including diskettes, drives, and other magnetic-based storage media, optical storage media, including disks (including CD-ROMS, DVD-ROMS, and variants thereof), flash, RAM, ROM, and other memory devices, and the like.

Software agents, including but not limited to negotiation agents and late binding agents, are utilized in some embodiments of the present subject matter. Generally speaking, any type of software agent may be used, with the actions of the software agent based on rules, parameters, profiles, and other data provided by the agent's principal or principals, i.e., the individual(s), group(s), or other entity (or entities) directing the agent's behavior. The degree of autonomy exercised by the agent may vary, and may depend on rules or preferences specified by the agent's principal. In some instances, the rules may provide for the agent to contact one or more persons and/or other agents for additional data, such as confirmation of a course of action or further information required by the agent to evaluate a situation. Agent functionality may be handled by single agents or coordinated amongst multiple agents. Agent(s) may reside in one computing device or may be distributed amongst multiple computing devices.

Figure 4:
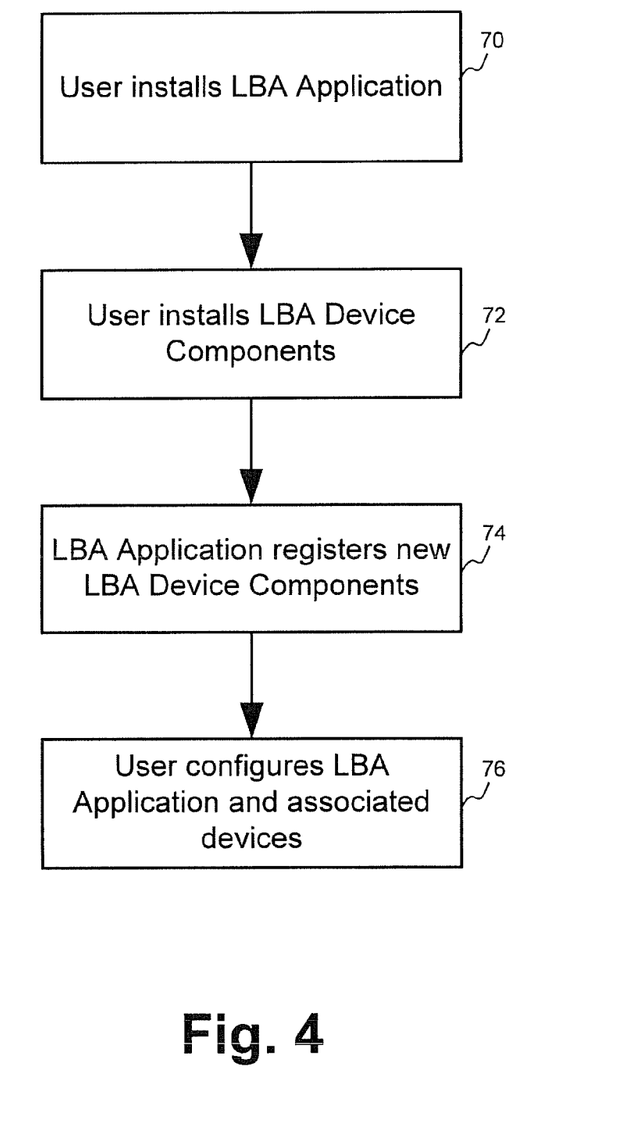
FIG. 4 is a flow chart showing exemplary steps in an LBA application setup and configuration process in accordance with aspects of the presently disclosed technology.
Figure 5:
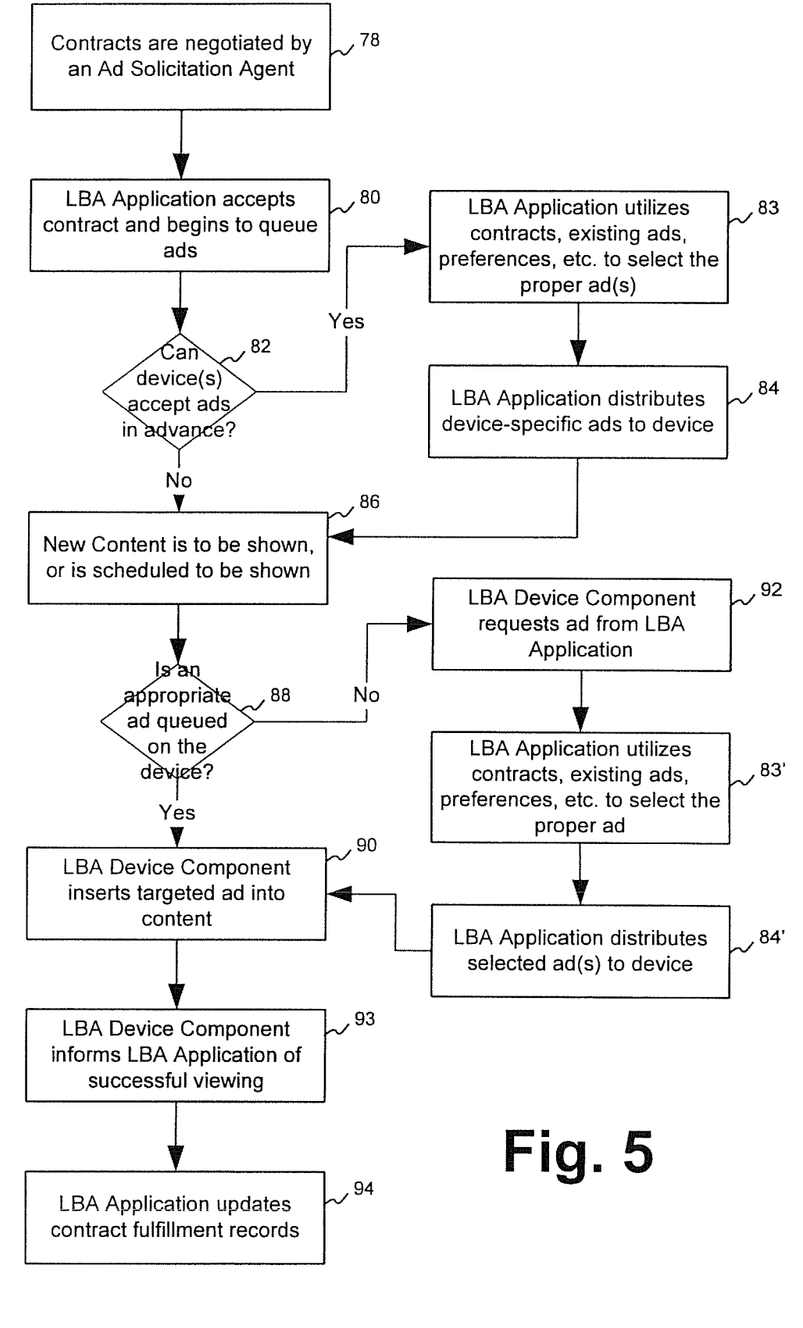
FIG. 5 is a flow chart showing exemplary steps in a method of targeted consumer-centric advertising from multiple sources to multiple consumer devices in accordance with aspects of the presently disclosed technology.
Figure 6:
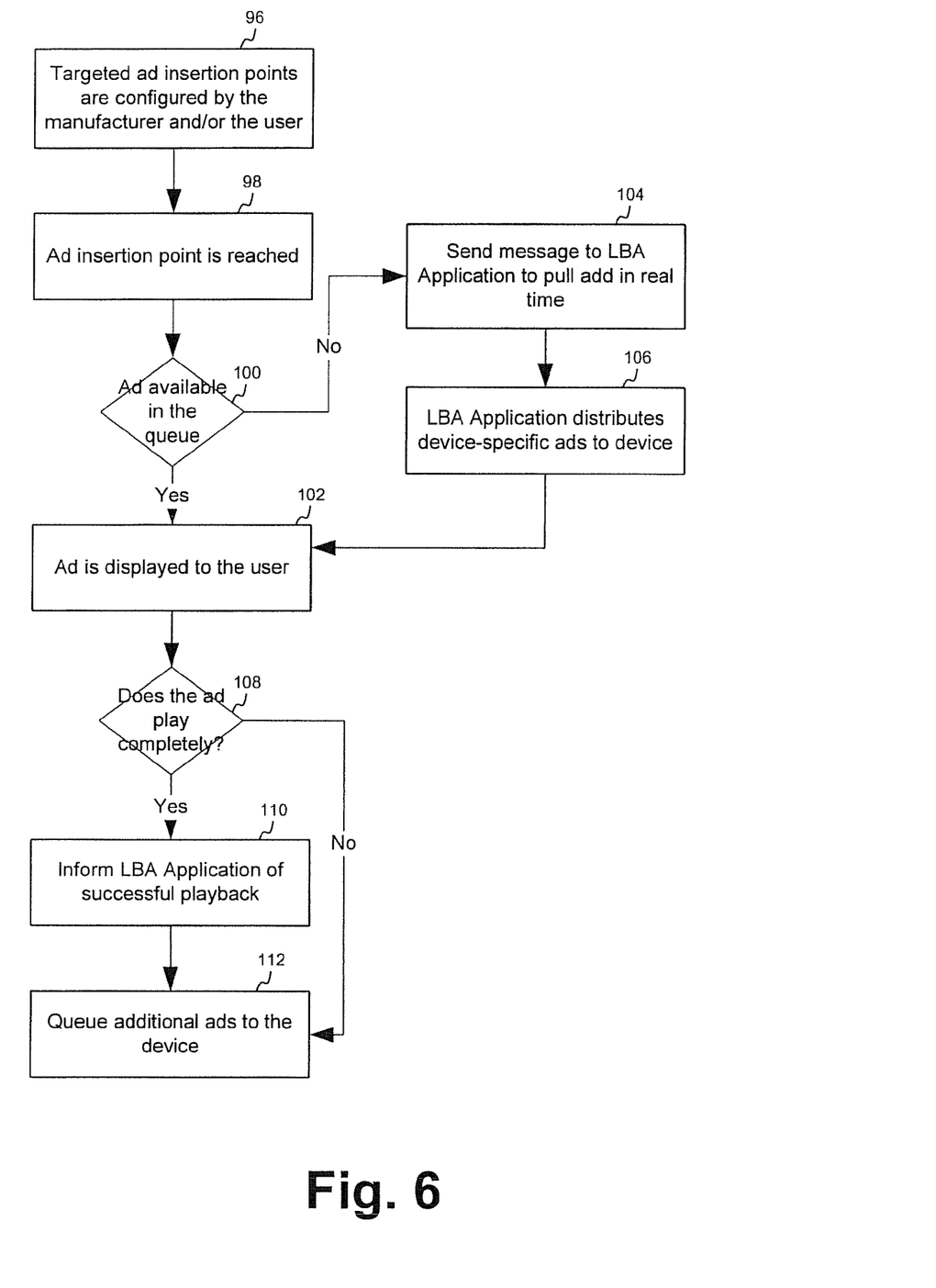
FIG. 6 is a flow chart showing exemplary steps in a method of implementing targeted consumer-centric advertising at alternative ad insertion points in accordance with aspects of the presently disclosed technology.

The presently disclosed technology is generally concerned with the functionality of a late binding agent (LBA) and related components employed in a consumer-centric targeted advertising system, where the system is capable of integrating advertisements into multiple respective content streams at multiple different destination devices associated with a given consumer. A detailed system configuration of such functional components is provided in FIG. 3, and exemplary processes associated with operation of such a system are depicted in FIGS. 4 through 6, respectively. Before focus is directed to such features, a general overview of an exemplary consumer-centric advertising system will be presented with reference to FIGS. 1 and 2. Additional details of such a system can be found in currently pending co-owned United States Patent Application entitled "Auction-Based Advertising Including Consumer Solicited Ad Distribution" having U.S. Ser. No. 11/678,261 which is hereby incorporated by reference herein for all purposes.

Figure 1:
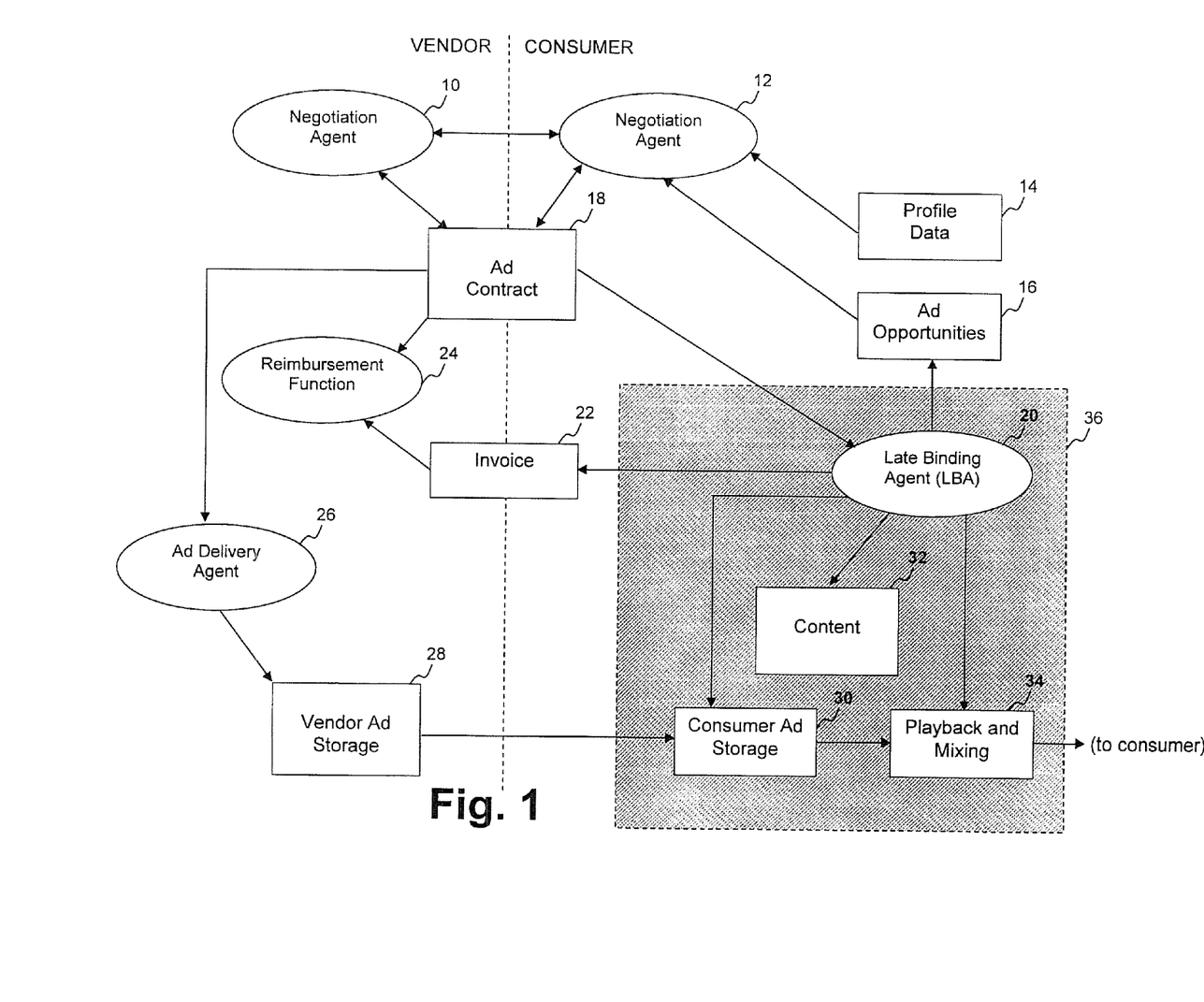
FIG. 1 is a functional block diagram of an exemplary consumer-centric advertisement distribution system.

FIG. 1 is a functional block diagram of an exemplary consumer-centric advertisement distribution system. FIG. 1 is divided by a dashed line illustrating the division between components on the vendor side and the consumer side. This example will first discuss an exchange between a consumer and a single vendor. However, in some embodiments, each consumer may interact with multiple vendors and/or each vendor may interact with multiple consumers. Additionally, while a vendor is the advertising entity in several examples herein, the use of a vendor is not intended to be limiting. Rather, advertising entities may comprise other types of single individuals, groups of individuals, or other entities seeking to advertise to one or more other individuals, groups, or entities.

In operation, a software-based negotiation agent (or multiple agents) 10 acting on behalf of a vendor engage in negotiations with corresponding software-based negotiation agent (or agents) 12 acting on behalf of the consumer. Consumer negotiation agent 12 accesses data including profile data 14 and ad opportunity data 16 and, based on the profile data 14, ad opportunity data 16, and any other consumer-specified rules, preferences and parameters, attempts to negotiate one or more ad contracts 18 between the vendor and the consumer. Ad opportunity data 16 is provided at least in part by late binding agent 20, which will be discussed in further detail below. Generally speaking, ad opportunity data 16 represents information indicating what resources (including both time and hardware) are available for negotiation.

Assuming a successful negotiation, ad contract 18 is established between the consumer and a vendor. Then, based on ad contract 18, several actions take place. On the vendor side, the data in ad contract 18 is used by a vendor ad delivery agent 26 to select one or more ads stored in vendor ad storage 28 to deliver to the consumer's ad storage 30 in accordance with the contract. On the consumer side, late binding agent 20 uses data including terms from ad contract 18 to display the ad(s) in accordance with the terms of the contract. Playback and mixing circuitry/software 34 is directed by late binding agent 20 to mix stored content 32 and one or more stored ads 30 for display to the consumer. Then, late binding agent 20 generates and transmits invoice 22 to the vendor based on the terms of contract 18. Invoice 22 is received by reimbursement function 24, which may be another software routine or agent configured to compensate the consumer based on the terms of ad contract 18.

Aspects of the exemplary components shown in FIG. 1 will now be discussed in closer detail. Vendor negotiation agent 10 and consumer negotiation agent 12 may each comprise any suitable type of software agent that engages in one or more negotiations according to rules specified by the party on whose behalf the agent is acting.

For instance, in some embodiments, consumer negotiation agent 12 comprises an auction agent that auctions advertising opportunities to one or more vendors. In such embodiments, vendor negotiation agent 10 can comprise an auction bidding agent. When configured as an auction agent, consumer negotiation agent 12 may offer advertising opportunities to one or more vendors in exchange for economic incentives. Depending upon consumer and vendor preferences, these incentives can include payments from the vendor, discount coupons, reward points or free items or content. The desired economic incentive can be included in factors defined by the consumer for use by agent 12 in conducting the auction and evaluating bids.

For instance, the consumer-defined factors may include but are not limited to: the degree an offered ad matches the consumer's tastes and interests, availability of bandwidth for receiving ads, availability of one or more destination devices on which to play back advertisements, availability of ad storage space, availability of time for viewing the ad, and the consumer's willingness to view advertisements. When multiple vendors wish to purchase the same advertising opportunity, the consumer may select the most desirable vendor(s) in terms of the incentive that is offered and other characteristics such as the particular vendor, the type of product being advertised, and the nature of the advertisements. In some situations, competition amongst the vendors may result in more incentive per advertising opportunity offered by the consumer.

Some factors defining the conduct of agent 12 may be explicitly defined by the consumer, such as a minimum payment or discount that must be received or a maximum amount of advertising time that is to be made available. However, some factors may be inferred from information regarding the consumer that is available to negotiation agent 12. For instance, consumer profile data 14 may be used by negotiation agent 12 to determine areas of interest (and disinterest) for the consumer. Profile data 14 may comprise any information about the consumer that is available from any source or sources. Profile data 14 may include consumer content and advertising viewing records, purchase and financial records, and personal and demographic information about the consumer. In some embodiments, profile data 14 may comprise a plurality of sets of profile data about a consumer. The sets can include public profile data that is available for release to potential advertising providers as part of the contract negotiation or execution and private profile data that is available only to consumer agents such as negotiation agent 12 and late binding agent 20.

Consumer negotiation agent 12 may also consider other data. For example, FIG. 1 shows that ad opportunity data 16 has been provided by late binding agent 20 for use by negotiation agent 12. Ad opportunity data 16 may include data that indicates the type and extent of advertising opportunities that are available for negotiation. For instance, ad opportunity data 16 may comprise scheduled recordings, downloads, or viewings of content. Additionally or alternatively, ad opportunity data may indicate the consumer's viewing status in real-time or near-real time. For example, if a consumer is viewing a program, ad opportunity data may include unsold or otherwise uncommitted advertising time for the program that is being viewed. The ad opportunity data may also include information indicating available ad storage space and network bandwidth for receiving ads.

Vendor negotiation agent 10 may comprise an auction bidding agent acting on behalf of a vendor based on various rules, preferences, and other parameters specified by the vendor. For instance, a vendor may provide rules that specify how advertising opportunities are to be valued and how bidding is to proceed. Bids may be determined based on factors including, but not limited to, the match of an ad to a consumer, the length of the ad, the type of destination devices available for accessing the ad, the size and quality of storage and other resources needed to display the ad, and the initial bidding price offered for the ad. The vendor may maintain one or more data stores that include information used by the vendor to value advertising opportunities. For example, as noted below, vendor negotiation agent 10 may have access to one or more databases that define the vendor's advertising budget, objectives, and strategy. For instance, the vendor may desire to target certain groups or types of consumers more heavily than others. Vendor negotiation agent 10 may be configured to provide greater incentives for ad opportunities related to the targeted consumers and less (or no incentives) to the non-targeted consumers.

Regardless of the type of negotiation, as noted above, consumer negotiation agent 12 may be configured to release certain information about a consumer as part of the negotiation process with vendor negotiation agent 10. For instance, vendor negotiation agent 10 may access information about the consumer to determine if the consumer is in the desired audience for a particular advertisement. In embodiments in which vendors bid on advertising opportunities, the bid price offered by vendor agent 10 may increase for consumers that are a more "desirable" match as defined by the vendor. Similarly, in embodiments in which consumer agents solicit for the opportunity to receive ads and advertising incentives, vendor agents 10 may consider the degree of match in determining which consumer bids to accept. As an example, if the vendor is a local microbrewery, the vendor negotiation agent 10 may evaluate potential advertisement opportunities based on whether the consumer that is providing the opportunities is in a certain age/income demographic and/or has bought beer recently. For instance, the microbrewery may configure its agent to bid only in consumer auctions offered on behalf of beer drinkers, or may configure its agent to bid lower in auctions offered by moderate beer drinkers. In situations in which the brewery is offering advertisements to be solicited by consumers, the brewery agent may be configured to reject offers from moderate beer drinkers, even if such offers are lower (i.e. cheaper) than those of beer drinkers.

The level of detail of the information released to vendor agent 10 may vary based on consumer privacy settings and may affect the bidding price or incentive amount the vendor is willing to offer. For example, if a consumer agent 12 releases vague information about the consumer, vendor agent 10 may offer a lower bid or change the maximum incentive amount available. This may be due to rules explicitly tying acceptable incentive levels to the amount of information available and/or due to the fact that a closer match is not possible due to limited information.

Once vendor negotiation agent 10 and consumer negotiation agent 12 reach agreement, the terms are memorialized in ad contract 18. Ad contract 18 comprises the consumer's agreement to provide one or more advertising opportunities to the vendor and the vendor's agreement to provide the agreed-upon incentive(s). Terms and other information that may be included in the contract may include, but are not limited to: unique identification of the vendor, unique identification of the consumer or display means, data identifying the ad(s) to be shown, such as ad serial numbers or unique IDs, format definitions for the ad(s), ad metadata for matching the ad(s) to programming, ad ratings (such as ratings defined by the TV Parental Guidelines system) or content flags, time and method of delivery and/or playback, times when the ad can/cannot be played, terms of payment for each display of the ad (which may be defined per ad version or as a total number of credits required per version or per ad), when the ad is to be discarded (if ever), an ad expiration time/date and any other suitable term or terms. Defined terms and related information about an advertisement may also be helpful, including parameters selected for each ad from the following: a unique ad identifier, a unique vendor identifier, ad metadata (including quality level and/or time duration) and ad rating. Information specific to different versions of an ad (for example, information such as an ad version, ad identifier, ad format, ad version metadata, device compatibility, etc.) may also be helpful, especially to define which devices are approved for accessing a given ad version based on device capabilities. For example, a mobile-device optimized version will not be utilized on a big screen television.

Of course, any of the above-mentioned terms (and any other terms) may be used in defining the conduct of negotiation agents 10 and 12. For instance, each party may define certain terms as non-negotiable and other terms as dependent on price. Rules for the auction and bidding process may then depend on the consumer's preferred terms. As an example, a consumer may define rules whereby the contract must prohibit "adult"-flagged ads and that the term is non-negotiable, while other terms regarding ad display resolution or bandwidth may be price-dependent (such as requiring higher bids for higher quality). Similarly, for a particular advertisement, a vendor may insist that any ad contract regarding that advertisement must provide for the ad to be shown during a certain time period or alongside certain content, while the number of showings is price-dependent (such as providing higher bids when more showings are offered).

For example, as noted above, a consumer may provide rules that prohibit consumer negotiation agent 12 from entering a contract to display ads of an adult nature. Therefore, if the consumer is auctioning an advertising opportunity, an offer from an advertiser of an ad with adult content may be refused, even if advertiser is offering an incentive that is higher than the other advertisers. Similarly, if the consumer is soliciting for an opportunity to receive ads, consumer negotiation agent 12 may be configured to ignore advertising opportunities where the offered ad is adult in nature, even if the incentive offered is above the consumer's threshold for acceptable incentive amounts. Of course, in either case, if the advertiser provides for a non-adult version of the ad to be available, successful negotiation may still be possible.

Contract 18 may be maintained as one or more components and in any suitable form or forms. For instance, both the consumer and the vendor may maintain a copy of contract 18 for future reference. In some embodiments, a copy of contract 18 may be provided to one or more third parties for safekeeping and/or verification in the event of a later dispute as to contract terms.

Once advertising contract 18 has been established between the consumer and the vendor, the remaining components of the advertising distribution system can access the terms of contract 18 and take steps to execute those terms. On the vendor side, one or more ad delivery agents 26 select ads from vendor ad storage 28 to send to the consumer. For instance, the vendor may maintain one or more repositories of ads for use with different audiences, and the appropriate ad may be selected based on information about the consumer. For example, a store may have produced a specific advertisement for English-speaking viewers and another advertisement for Spanish-speaking viewers. Based on consumer demographic or other information (and the contract terms), the appropriate ad may be selected.

For example, during the negotiation process, the vendor may have learned that the consumer is in a certain demographic (or the vendor may have only participated in negotiations where the consumer is in a desired demographic) and may select an ad that matches the demographic. Such consumer information may be provided, for example, by vendor negotiation agent 10. Alternatively, information used in selecting the ad may be included in contract 18. For instance, as noted above, contract 18 may specify the type of ad(s) to any degree of granularity, even to the point of uniquely identifying one or more particular advertisements in the contract. In any event, ad(s) that conform to contract and any vendor preferences are transmitted to consumer ad storage 30.

The ads may be transmitted in any suitable manner. For example, both the vendor and consumer may maintain connections over one or more wide-area networks such as the Internet. In other embodiments, the advertisements may be transmitted by other network connections—for instance, the ads may be transmitted using a cable television system's distribution channels to the consumer for video-on-demand content when such channels are not in use.

In some embodiments, the ad(s) are distributed out-of-band with regard to the content for display. For instance, the ad(s) may be provided to the consumer for storage separately from any content the ads are to be displayed with. As an example, a consumer and vendor may negotiate for display of an ad preceding a certain type of pay-per-view movie. For instance, a camping equipment company may negotiate the display of an ad for survival equipment preceding an action movie. The ad may be distributed to the consumer where it is maintained in storage. The consumer may conceivably not view an action movie until a considerable time after the time the ad is received.

Ad display can be handled by a consumer-side late binding agent 20 running on one or more computing devices associated with the consumer. For instance, the late binding agent may be included in software running on a television set-top box (STB). Although various examples herein use a set-top box, the functionality provided by components such as the late binding agent, viewer profiles, ad storage, video content storage, and user interface may be provided any suitable hardware including, but not limited to, the set top box, a personalized video recorder, personal computer, multi-function multimedia center, home gateway router, dedicated computing device, and remote proxy server or client, and the like.

Based on data including the terms of contract 18, the consumer's viewing activity, and consumer preferences, late binding agent 20 selects one or more stored ads and directs playback and mixing software/circuitry to mix and otherwise display the ads with content 32. Details of an exemplary late binding agent 20 and related components included in the shaded area 36 of FIG. 1 are a significant focus of aspects of the present subject matter and will now be discussed in further detail.

Figure 2:
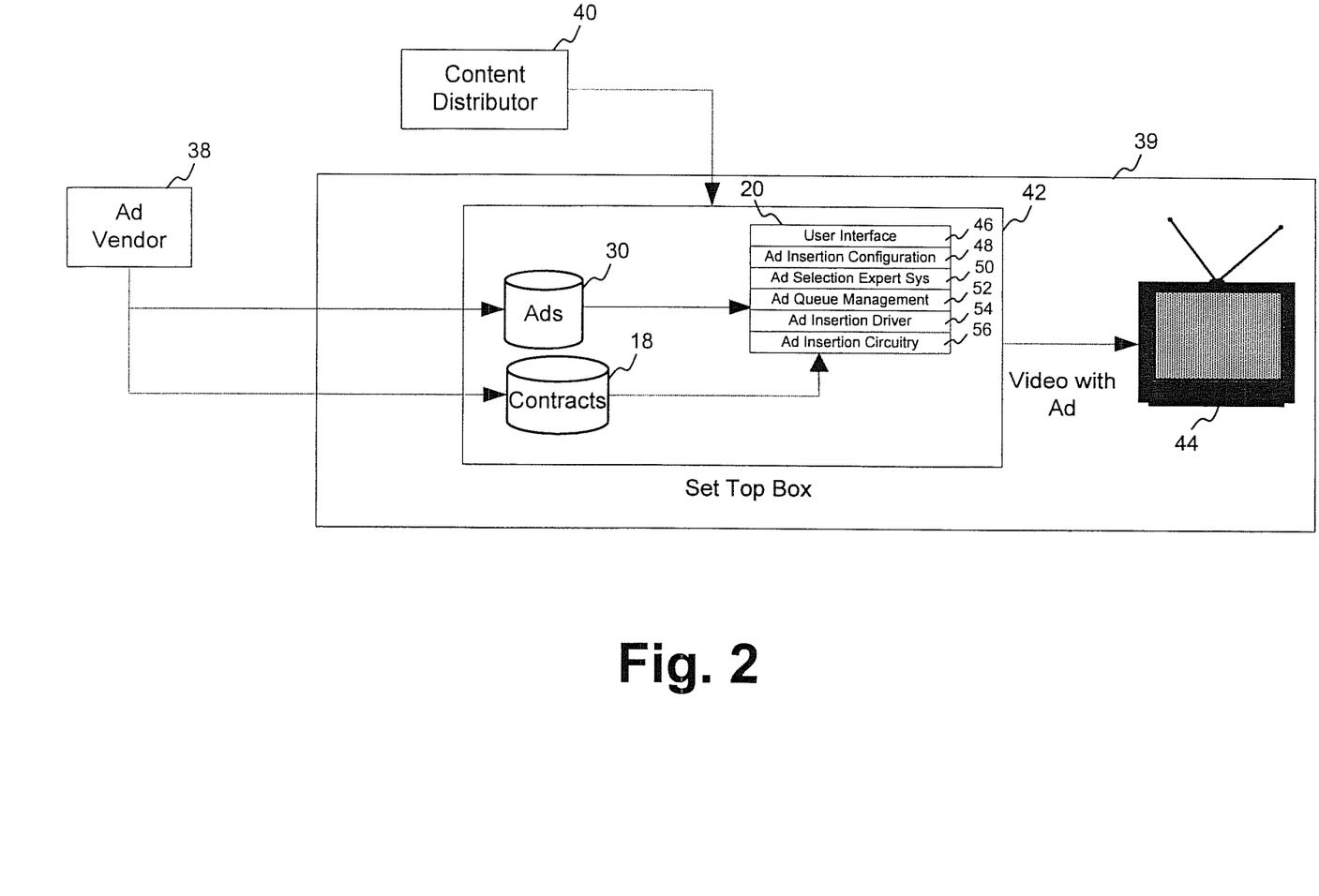
FIG. 2 is a functional block diagram of a late binding agent (LBA) as utilized in the consumer-centric distribution system of FIG. 1 for controlling ad insertion into a data stream based on consumer profile data.

Referring now to FIG. 2, exemplary details of one late binding agent that may be utilized in accordance with the targeted advertising system depicted in FIG. 1 are provided. In the example of FIG. 2, discussion is directed to integration of targeted advertising into a video stream for playing on a cable television system's distribution channels, however it should be appreciated that the subject technology may be used to integrate advertisements into different types of content of different types of destination devices, as will be discussed later in further detail.

Portion 39 of FIG. 2 generally represents a given consumer and includes various devices as may be provided by and/or associated with the given consumer for accessing content and for implementing targeted advertising in accordance with the subject technology. Consumer 39 may be provided with a set top box 42 and a destination device 44, which is depicted as a television in the example of FIG. 2. Set top box 42 is configured to receive content from a content distributor 40, who provides content that may ultimately be viewed by the given consumer at the destination device 44. A content provider in the given exemplary embodiment may correspond to a television network/station, a cable television provider, satellite television providers, or the like. It should be appreciated that content providers would differ if the type of content was other than video and/or if the destination device 44 was other than a television.

In accordance with the targeted advertisement negotiations that may have already occurred in accordance with aspects of the present technology as discussed with reference to FIG. 1, one or more negotiated ads may be stored in a database 30. In one embodiment, the "Ads" database depicted in FIG. 2 is the same as the consumer ad storage location 30 represented in and discussed with reference to FIG. 1. The ads stored in ad storage 30 are provided to the given consumer 42 in accordance with one or more advertising contracts between the given consumer and one or more advertising entities. Such advertising contracts are stored in the "Contracts" database 18 (similar to Ad Contract component 18 of FIG. 1). Late binding agent 20 of FIG. 2 is configured to control ad insertion of ads in storage 30 into the content received from content distributor 40 such that the given consumer's destination device 44 receives content (e.g., video) with ads integrated therewith. Late binding agent 20 may control ad insertion based on the public and/or private consumer profile information such as that provided in the profile data store 14 of FIG. 1. Other functions of LBA 20 include generating invoices or invoice data as ads are played on destination device 44 per previously negotiated contracts with advertising entities/vendors. Such invoices may produce an economic reimbursement, payment or other incentive to the consumer for viewing the ad per terms of a pre-negotiated contract between consumer and vendor.

With more specific reference to FIG. 2, the system functionality of LBA 20 is generally divided into a plurality of components, including a user interface component 46, an ad insertion configuration component 48, an ad selection expert system 50, an ad queue management component 52, an ad insertion driver 54, and ad insertion circuitry 56.

User interface component 46 is provided so the given consumer 39 has a mechanism by which to specify additional preferences for such features and aspects including but not limited to the display of content, the selection of ads, the desired, allowable or preferred methods of integrating ads into content, user profile information or incentive preferences used for negotiating advertisement contracts with third-party vendors, profile information for destination devices and/or content distributors associated with the given consumer, etc.

The ad insertion configuration component 48 utilizes information inputted by the given consumer via the user interface 46, or other information already available to the LBA 20 (e.g., information stored as profile data 14 and ad opportunities 16 of FIG. 1) to determine one or more select locations for integrating advertisements into received content. For example, ad insertion configuration component 48 may utilize consumer information to determine that ads featuring new automobiles should be integrated during commercial breaks in a NASCAR race viewed by the given consumer.

The ad selection expert system 50 included in LBA 20 may be provided to assist with the selection of ads from an advertising entity (e.g., a third-party vendor) and/or to assist with the selection of already negotiated ads into a consumer's content (e.g., video data). Selecting which ads to view is slightly different than the function of the insertion configuration component 48 in that the selection expert system 50 decides which ads to integrate and the configuration component decides where/when to integrate the selected ads. These tasks inherently go hand in hand, and so it should be appreciated that some embodiments of LBA 20 include a single component that integrates these or other features of LBA functionality into a fewer or greater number of components.

Ad Queue Management component 52 of LBA 20 is configured as an interface for monitoring and determining when ads should be pushed to the destination device 44 from the consumer's set top box 42 or other central consumer location. For example, if a destination device can accept ads in advance of being viewed by a consumer, then LBA 20 may forward such ads to the destination device 44, where they will be integrated at the time of viewing. If this is the case, ad queue management component 52 keeps track of ads that are sent in advance to a destination device, and determines when more ads should be passed along. Ad queue management may also contribute to the function of monitoring the destination device to confirm when selected ads are actually viewed by the given consumer.

Referring still to the exemplary components of LBA 20, an ad insertion driver 54 and/or ad insertion circuitry 56 is provided to serve as the respective software and hardware interfaces between the other functional components of LBA 20

(including components 46-52, respectively) and destination device 44. Such ad insertion components 54 and 56 may typically be specifically tailored to the destination device 44 used by the given consumer.

Figure 3:
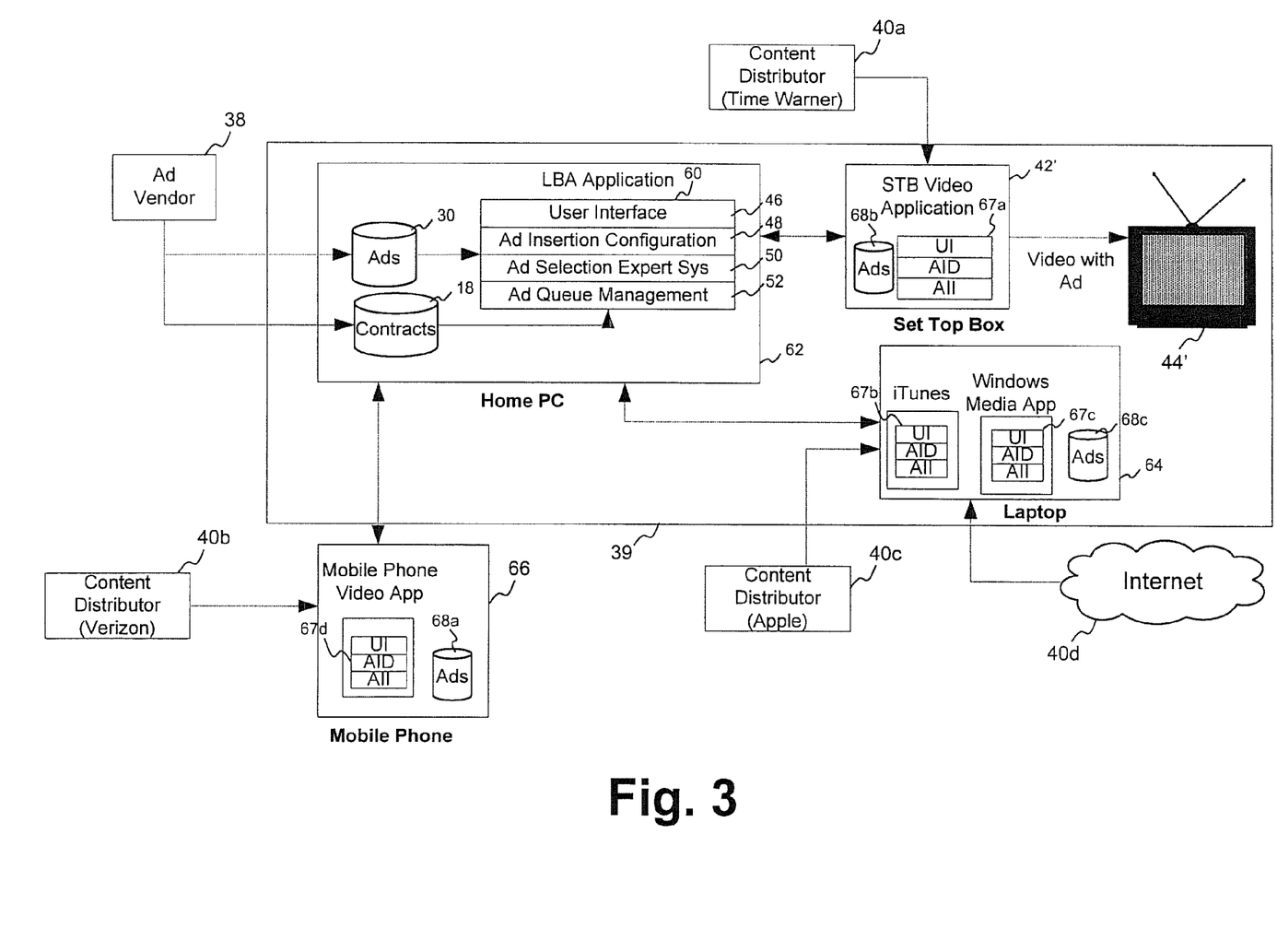
FIG. 3 is a functional block diagram of an exemplary consumer-centric advertisement distribution system utilizing split LBA application and device component functionality in accordance with one embodiment of the presently disclosed technology.

In accordance with an embodiment of the subject technology, the functional components of the LBA 20 depicted and described with reference to FIG. 2 are partitioned to allow targeted ad redemption via multiple destination devices and from multiple content distributors, as illustrated in FIG. 3. Some LBA components remain in a centralized location, and those include device-independent components such as the user interface 46, ad insertion configuration component 48, ad selection expert system 50 and ad queue management component 52. This group of device-independent components will be collectively referred to herein as LBA Application 60. As illustrated in FIG. 3, LBA Application 60 may be provided on a selected location such as a computer associated with the given consumer 39. In one embodiment, LBA application 60 is located on home PC 62, but in other embodiments the LBA application 60 may operate on the set top box (STB) 42', laptop 64, or other destination device or programmable device capable of executing computerized instructions. Although the LBA Application 60 is referred to herein as provided in a centralized location, this description is for relative positional reference and should not be construed as a requirement that the LBA Application interacts with respective LBA Device Components 67 in a central-server type relationship.

Referring still to FIG. 3, additional ad integration components are considered device-dependent and so may be respectively provided on each destination device associated with consumer 39 that may receive ads for integration with various forms of content. Exemplary destination devices as illustrated in FIG. 3 include a home PC 62, a laptop 64, a television 44', and a mobile phone 66. It should be appreciated that other destination devices not illustrated may also be utilized with the subject targeted advertising technology, including but not limited to telephones, PDAs, music players, digital photo frames/displays and other devices that have an audio and/or display output component. Also, more than one of a given type of destination device may be associated with a given consumer. Also, different types of destination devices may all be associated together for multiple respective members in a given group (e.g., a family, an employer, an apt. complex, etc.) Each destination device is configured to receive content from an appropriate content distributor. For example, STB 42' may receive video-based content from a cable or satellite television content distributor 40a, such as Time Warner Cable. A mobile phone 66 may receive cellular content (including text, audio, video, image and/or other files) from a content distributor 40b, such as Verizon Wireless. Laptop 64 may receive multiple content streams from an audio/video content distributor 40c, such as Apple iTunes, and from an Internet provider 40d. Additional content distributors than those illustrated or described may also be utilized in accordance with aspects of the present technology, and any destination device capable of receiving multiple content streams may selectively do so.

The device-dependent components provided on each capable destination device include a device-specific user interface (UI), an ad insertion driver (AID) component and an ad insertion implementation (AII) component. Each UI component may be similar to the user interface 46 provided in the LBA Application 60, but customized to accommodate the input mechanisms associated with the given destination device. Although the user interface component provided at each destination device is separate from the user interface component 46 of LBA Application 60, such respective user interface components function together to obtain collective input from a given consumer. Each AID component is likewise similar to the ad insertion driver 54 illustrated in FIG. 2, but tailored to interface specifically with its given destination device. Each AII component is configured to include actual ad insertion circuitry and optional device-specific ad insertion rules specific to a given destination device. Such group of device-dependent components will be collectively referred to herein as an LBA device component 67 (respective instances of which are illustrated in FIG. 3 as LBA device components 67a, 67b, 67c and 67d).

The LBA device component 67 on each destination device is configured to communicate with LBA application 60 over any type of network, including but not limited to a dial-in-network, a local area network (LAN), wide area network (WAN), public switched telephone network (PSTN), the Internet, or any combination of hard-wired or wireless communication links. It should be appreciated that each LBA device component 67 is typically built into a device-specific playback application, and a single destination device may have multiple LBA device components. For example, within laptop 64, there may be one LBA device component 67b for Apple's iTunes or other music player and one LBA device component 67c for Windows media player or other media player, and perhaps a still further LBA device component for an Internet browser such as Windows Explorer. Although specific examples are provided, generic application-level LBA device components may be implemented.

Each destination device associated with a given consumer that is capable of receiving advertisements for integration with received content is configured to receive ads from the LBA application 60. Each respective destination device may have a local database 68a, 68b, 68c capable of storing such ads from LBA application 60, but this may not always be the case. For devices not capable of storing ads locally, ads are not queued at the destination device but rather relayed to such device when needed for actual playback by a consumer.

Referring now to FIG. 4, aspects of application setup and configuration related to a process of registering each destination device (and corresponding LBA Device Component 67) with the LBA Application 60 will now be discussed. In one embodiment, the LBA Application 60 and LBA Device Components 67 are installed separately, as represented by steps 70 and 72, respectively. LBA Device Components 67 can be added or removed at any time. A link or recognition between the LBA Application and each LBA Device Component is then effected in exemplary step 74. In one embodiment, the LBA Application 60 can "search" for new LBA Device Components or the user can explicitly initiate the search or make the connection manually. After registration in step 74, a user (consumer) then configures the LBA Application and associated devices in step 76. In one embodiment, the LBA Application can remotely configure the LBA Device Components. Alternatively, each LBA Device Component may provide configuration options through its own UI. If so, the relevant configuration options are sent back to the LBA Application where all of the configuration options are stored and maintained. The user/consumer may make configuration changes at any time. During the registration process, the LBA Application configures the LBA Device Component(s) regarding what type of device operations, records, etc. to gather and return to the LBA Application.

With more particular reference to aspects of system configuration as generally referenced in the steps of FIG. 4, it is noted that the user is able to configure and manage the overall operation of the LBA Application and associated devices, including but not limited to such aspects as viewing preferences, contract preferences, and other interests, from the LBA Application interface. Contract solicitation preferences are sent to the Ad Solicitation Agent and utilized to select the appropriate type and version of the advertisement. Additionally, each device may have its own interface for configuring the operation of ad insertions for that device. Any configuration parameters set via the device UI that are relevant to the overall operation of the system are copied to the LBA Application.

A wide variety of different configuration and management options are possible from the LBA Application, including but not limited to options related to contract fulfillment, available advertisements, targeted ad playback configuration (per each destination device), and contract negotiations. Exemplary options selectable via an LBA application concerning contract fulfillment aspects, include without limitation an option to view active contracts and current status, and to view payments to date. Exemplary options concerning available ads include without limitation an option to view an inventory of ads, and/or an option to rate, accept, or reject ads and/or ad versions. With respect to targeted ad playback configuration (per destination device(s)), user-selectable options may be available to activate/deactivate ad playback, to manage insertion point configuration settings, to activate timeframes for allowing/preventing ads (e.g., an instruction not to send targeted ads to a laptop during work hours), and other user preferences. Features for managing insertion point configuration settings allow a user to control which device insertion points to utilize for targeted ads. Examples of insertion points include (but are not limited to) before/after content, during content (defined and/or undefined breaks), while placing a call, while connecting to the Internet, or while browsing one or more certain web sites. Further user preferences may relate to ad type, ad format and ad ratings. For example, when a destination device is configured for operation by a child member of a given family, an authorized consumer may define preferences such that only "G" rated ads or other limited content ratings are provided to the young person's destination device. A still further aspect configurable by a given consumer via the LBA application concerns contract negotiations. Exemplary related features include acceptable advertising rates or corresponding incentives and/or ad preferences (in terms of format, rating, type, etc.)

Referring now to FIG. 5, exemplary steps associated with the overall operational flow of the subject targeted advertisement system, such as that illustrated in FIGS. 1 and 3, will now be discussed. A first step 78 in such a process involves the negotiation of one or more contracts by an ad solicitation agent (e.g., negotiation agent 12 in FIG. 1) on behalf a given consumer or group of consumers. Such advertising contract(s) are negotiated between vendor and consumer and are accepted by the LBA Application in step 80. The contract(s) may be stored at component 18 in FIGS. 1 and 3. Once one or more contracts have been negotiated, the LBA Application also begins in step 80 to receive and queue ads. In one example, such ads may be received from vendor ad storage 28 as illustrated in FIG. 1. Since received ads may ultimately be accessed by a consumer on different types of destination devices, it should be appreciated that basic ad structure and features may be different to accommodate differing device-specific functionality. An ad for a given target product, service, company, etc. may have different ad versions that differ in such characteristics as time duration and/or quality level. For example, a thirty-second version of one advertisement may be configured for access on a broadband device such as a computer or a television, while a ten-second version of the same advertisement is configured for access on a mobile phone. In other examples, quality level may differ among different versions of a given advertisement. Depending on the destination device, an advertisement may have a different file size or length, resolution, bit rate, bandwidth size or requirement, color type, other compression characteristic bearing on the quality level of the advertisement, or any other file attribute or the like. Still further characteristics of an advertisement may differ for different destination devices. Such varied versions of advertisements may be provided by the vendor, or may be created by the LBA application after receiving one or more general forms of the advertisement from an advertising entity.

Referring still to FIG. 5, an LBA application then determines in step 82 whether a destination device can accept ads in advance (i.e., whether a destination device has some sort of local memory or cache capable of storing advertisements). If a destination device does accept ads in advance, then the LBA Application utilizes negotiated contract information (e.g., information stored in contracts database 18 of FIG. 3), the available ads that have already been provided from one or more advertising entities (e.g., ads stored in database 30 of FIG. 3), specified consumer and/or device preferences, and other characteristics as deemed appropriate to select in step 83 the proper ad(s) for sending to a destination device. The LBA Application then distributes device-specific ads to the destination device(s) in step 84. It should be appreciated that an LBA device component associated with a destination device can make a request for more ads at any time. The device may be aware of content that is scheduled to be played. This information can be passed back to the LBA Application in order to retrieve context-sensitive ads.

Referring still to FIG. 5, whether the ads are provided in advance or not, the point at which new content is to be shown or is scheduled to be shown is indicated in step 86. At this point, a determination is made in step 88 whether an appropriate ad is queued on the given destination device. If so, the LBA device component inserts the targeted ad into content available at the destination device in step 90. If no ad is queued at the destination device, then the LBA device component requests an ad from the LBA application in step 92. At that time, the LBA application selects a proper ad in step 83' and distributes the selected ad(s) to the device in step 84' (in a similar fashion as already discussed with reference to steps 83 and 84, respectively), before inserting the targeted ad into content in step 90. After inserting an ad into content in step 90, an LBA device component may monitor the actual access or playback of the ad by the given consumer and if appropriate will inform the LBA Application in step 93 of successful access (e.g., viewing, listening, etc.) of the ad by the given consumer(s). After receiving such a confirmation indication in step 93, the LBA application may update contract fulfillment records in step 94.

Receipt of ad playback confirmations and subsequent contract updating steps are significant in accordance with the presently disclosed technology because the subject system enables a consumer to access an ad from a number of different devices and under varying circumstances. The previously negotiated contract defines the allowed means for watching the ad and how many "credits" the user receives for each circumstance. For example, in systems having a single destination device such as a STB or television, a contract may be fulfilled when the advertisement is inserted three (3) times into a video (and watched by the consumer). This would equate to three (3) credits. The system as illustrated in FIG. 3 with multiple possible destination devices affords an ad vendor (and consumer) the ability to reach the equivalent of three (3) credits under varying circumstances. The contract may, for example, specify that the user receives one (1) credit for watching the advertisement in the context of VoD content, ½ credit for watching the ad on their mobile device, $\frac{1}{10}^{th}$ credit for watching a banner ad on their browser, etc. Such varied possible credit scenarios are defined by the negotiated advertising contract between consumer and vendor. The LBA is responsible for calculating the credit value, based on verified "user views" from the various devices and, when contractual commitments are made, reporting that back to a billing engine or system for payment.

Additional aspects related to the negotiated contracts among vendors and consumers for ads playing on multiple destination devices concerns the relation between different versions and corresponding prices. As previously described, targeted ad redemption contracts are enhanced to allow for multiple redemption options, and multiple versions of an advertisement may be created as necessary to support the different destination devices. Each redemption option may have different terms/rates. For example, a 30-second version of an advertisement may be worth $0.50 for 3 broadcast ad insertions while a 10-second version tailored for a mobile device may be worth only $0.10 for 5 views on a mobile device. A single contract can be fulfilled via multiple distribution paths. Examples of multiple redemption options include, but are not limited to (i) ad insertions via a STB for broadcast or VoD; (ii) ad insertions on a PC/laptop for video served through the Internet; (iii) ad insertions on a PC/laptop for video local to the computer; (iv) ad banners while browsing; (v) ad videos served while browsing; (vi) ad videos watched via handheld; and (vii) ad audio-only played on mobile phone or music player.

Reference will now be directed to FIG. 6, in which exemplary steps associated with process flow for alternative ad insertion points is discussed. The functionality and steps discussed with reference to FIG. 6 are those that may be performed in part by the ad insertion configuration component 48 discussed earlier with reference to FIGS. 2 and 3. As already discussed, the present system is not limited to replacing ads in a video. The subject consumer-centric advertising system enables devices, and associated media players or other applications, to render a targeted consumer ad. The device/application combination may insert targeted advertisements before, during or after a media file playback, before or after a specific operation is performed on the device, or at other timing locations. Such insertion points are configurable by the device/application manufacturer and/or by the consumer(s). For example, a mobile phone may be configured to play an audio version of an advertisement when the user selects the "send" button to initiate a call. In another example, a television may be configured to play a video version of the same advertisement when the user is in a defined commercial break.

Referring more specifically to FIG. 6, a first step 96 involves the actual configuration or selection of targeted ad insertion points for the one or more destination devices. As discussed above, this selection/configuration can occur by the manufacturer(s) and/or the consumer(s). When it is then determined in step 98 that an ad insertion point is reached, a destination device then determines in step 100 if ads are available in its local memory (if available). If so, then an ad is displayed to the consumer in step 102. If not, then the destination device sends a message in step 104 to the LBA Application to pull an ad from the consumer ad storage or from a vendor ad storage location. In step 106, the LBA Application distributes device-specific ads as requested to the destination device before such ad is played to the consumer in step 102.

After the ad is at least attempted to be provided to a consumer in step 102, monitoring is performed so that a determination can be made by the LBA device component in step 108 whether the ad was played, heard, or otherwise accessed in its entirety by the given consumer. Such a determination may be desirable, especially when destination devices offer a consumer the option to "skip" given advertisements. If playback was successful, then the LBA device component informs the LBA application of successful access in step 110. It is important to record back to the LBA application an indication of each instance in which playback was successful so that a consumer can get credit for viewing ads in accordance with negotiated contracts. If the ad was not accessed in its entirety, then the specific ad could be requeued to the destination device, or additional ads could be queued to the device, as indicated in step 112.

Generally speaking, some embodiments of the subject technology are configured such that the LBA Application drives the overall operation of the system. However, in other embodiments, some "smart" functionality or decision-making capabilities exist on the various destination devices. Thus, each device may have operational rules that help optimize the ad insertion process. For example, a destination device may specify that when its ad queue is less than 50% full, it requests additional ads from the LBA Application. In another example, a rule may specify that, if the volume is turned down on the audio component of a destination device, the device shall not accept any ad insertions. These rules are configurable by the user on the LBA Device Component UI. Additionally, input from the user may drive or alter the configuration of such rules. For example, if the user chooses to skip more that one ad in a row, the device may temporarily halt any future ad insertions. In addition, before and/or during playback using LBA ad insertion, a consumer may interact with the LBA through the GUI playback application to dynamically optimize ad playback and ad time value.

Several examples herein discussed profiling, negotiations, display, and invoicing for advertising opportunities to individual consumers. However, the present subject matter is not limited to use on an individual consumer-by-consumer basis. Instead, the present subject matter may be applicable to any type of advertising consumer, including situations in which a group of individuals or other entity wishes to directly provide advertising opportunities in exchange for incentives. For instance, advertisements may be downloaded and displayed pursuant to contracts made between advertisers and households. As another example, a bar may auction opportunities to present advertisements (or bid in auctions for the opportunity to receive ads) for display using one or more in-bar televisions.

Several of the examples above discussed systems in which one or more late binding agents (LBAs) were executed by consumer hardware, such as set-top boxes. However, in other embodiments, some or all LBA functionality may be distributed to other hardware. For example, several instances of a late binding agent, each acting on behalf of a respective consumer, may be executed on other hardware, such as an upstream node in a cable or other network. Thus, although, for example, the terms of a consumer's contract(s) may be negotiated by consumer-side hardware and software, the logistics of ad insertion and display may be coordinated entirely or in part by a late binding agent at a different location.

It is appreciated by persons skilled in the art that what has been particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. An advertisement delivery system, comprising:
at least one computing device adapted to:
receive a plurality of advertisements for delivery to a given consumer, wherein a first advertisement of the plurality of advertisements is received from a first advertising entity and a second advertisement of the plurality of advertisements is received from a second advertising entity;
receive a plurality of contracts, wherein a first contract of the plurality of contracts defines first distribution parameters associated with the first advertisement, including a plurality of first advertisement credits, each of the plurality of first advertisement credits corresponding to one of a plurality of different types of destination devices on which the first advertisement may be viewed, and a second contract of the plurality of contracts defines second distribution parameters associated with the second advertisement, including a plurality of second advertisement credits, each of the plurality of second advertisement credits corresponding to one of the plurality of different types of destination devices on which the second advertisement may be viewed;
interface with a plurality of destination devices associated with the given consumer;
distribute the first advertisement to a first destination device of the plurality of destination devices in accordance with the first contract, and distribute the second advertisement to a second destination device of the plurality of destination devices in accordance with the second contract;
receive a confirmation indication from the first destination device indicating that the first advertisement was viewed on the first destination device; and
initiate issuance of a credit amount based on a one of the plurality of first advertisement credits that corresponds to the first destination device.

2. The system as set forth in claim 1, wherein the first distribution parameters identify a particular credit to be provided to the given consumer upon a predetermined number of viewings of the first advertisement, and wherein the at least one computing device is further adapted to determine that the first advertisement has been viewed the predetermined number of viewings based upon the receipt of the confirmation indication, and initiate issuance of the particular credit to the first consumer based on the determination.

3. The system as set forth in claim 1, wherein the at least one computing device is further adapted to:
update records of fulfillment associated with the first contract.

4. The system as set forth in claim 1, wherein the at least one computing device is further adapted to:
generate and send at least one invoice in accordance with the terms of the first contract.

5. The system as set forth in claim 1, wherein the at least one computing device is further adapted to:
identify the first advertising entity as a potential party to the first contract; and
negotiate an exchange with the first advertising entity, including establishing the first contract between the given consumer and the first advertising entity.

6. The system as in claim 5, wherein negotiating an exchange comprises:
participating in an auction held by the first advertising entity; and
providing, on behalf of the given consumer, one or more bids to the first advertising entity.

7. The system as in claim 5, wherein negotiating an exchange comprises:
conducting an auction on behalf of the given consumer; and
receiving one or more bids from the first advertising entity.

8. The system as set forth in claim 1, wherein the at least one computing device is further adapted to:
receive feedback data including data regarding a display of the first advertisement; and
release at least one incentive in accordance with the first contract.

9. The system as set forth in claim 1, wherein the distribution of the first advertisement is implemented upon request by the first destination device.

10. The system as set forth in claim 1, wherein the at least one computing device is further adapted to:
establish respective credit values associated with each destination device for the first advertisement.

11. The system as set forth in claim 1, wherein a third advertisement of the plurality of advertisements is a different version of the second advertisement, and wherein the third advertisement is a version suitable for playing on a third destination device of the plurality of destination devices, and not suitable for playing on the second destination device.

12. The system as set forth in claim 11, wherein the second advertisement and the third advertisement have different time duration relative to one another.

13. The system as set forth in claim 11, wherein the second advertisement and the third advertisement have different quality levels relative to one another.

14. The system as set forth in claim 1, wherein the at least one computing device comprises a late binding agent.

15. The system as set forth in claim 14, wherein said late binding agent is configured to operate on a computer accessible by the given consumer.

16. The system as set forth in claim 1, wherein the at least one computing device is further adapted to access profile data regarding the given consumer.

17. The system as set forth in claim 1, wherein the plurality of destination devices comprise one or more of set top boxes, laptops, mobile phones, personal computers, telephones, televisions, music players, PDAs, and digital photo displays.

18. The system of claim 1, wherein the first destination device comprises a mobile cellular phone and the second destination device comprises a set top box.

19. A method for delivering advertisements to a given consumer, comprising:
receiving, by a computing device, a plurality of advertisements for delivery to the given consumer, wherein a first advertisement of the plurality of advertisements is received from a first advertising entity and a second advertisement of the plurality of advertisements is received from a second advertising entity;
receiving, by the computing device, a plurality of contracts, wherein a first contract of the plurality of contracts defines first distribution parameters associated with the first advertisement, including a plurality of first advertisement credits, each of the plurality of first advertisement credits corresponding to one of a plurality of different types of destination devices on which the first advertisement may be viewed, and a second contract of the plurality of contracts defines second distribution parameters associated with the second advertisement, including a plurality of second advertisement credits, each of the plurality of second advertisement credits corresponding to one of the plurality of different types of destination devices on which the second advertisement may be viewed;

interfacing, by the computing device, with a plurality of destination devices associated with the given consumer;

distributing, by the computing device, the first advertisement to a first destination device of the plurality of destination devices in accordance with the first contract, and distribute the second advertisement to a second destination device of the plurality of destination devices in accordance with the second contract;

receiving a confirmation indication from the first destination device indicating that the first advertisement was viewed on the first destination device; and initiating, by the computing device, issuance of a credit amount based on a one of the plurality of first advertisement credits that corresponds to the first destination device.

20. The method as set forth in claim 19, further comprising a step of providing a late binding agent for performing said receiving and distributing steps.

21. The method as set forth in claim 20, further comprising a step of registering each destination device with the late binding agent.

22. The method as set forth in claim 19 further comprising inserting the first advertisement at the first destination device into content available at the first destination device.

23. The method as set forth in claim 19, further comprising a step of updating records of fulfillment associated with the first contract.

24. The method as set forth in claim 19, further comprising a step of generating and sending at least one invoice in accordance with the terms of the first contract.

25. The method as set forth in claim 19, wherein said distributing step is implemented upon request by the first destination device.

26. The method as set forth in claim 19, further comprising a step of establishing respective credit values associated with the first destination device for the first advertisement.

27. The method as set forth in claim 19, wherein a third advertisement of the plurality of advertisements is a different version of the second advertisement, and wherein the third advertisement is a version suitable for playing on a third destination device of the plurality of destination devices, and not suitable for playing on the second destination device.

28. The method as set forth in claim 19, wherein said distributing step more particularly comprises:
   accessing profile data regarding the given consumer; and
   selecting the first advertisement for distribution to the first destination device based on the profile data.

29. The method as set forth in claim 19, further comprising the following steps to be performed before said receiving step:
   identifying one or more advertising entities as potential parties to an advertising contract with the given consumer; and
   negotiating an exchange with a first advertising entity, including establishing a first advertising contract between the consumer and a first advertising entity.

30. The method as set forth in claim 29, wherein said step of negotiating an exchange comprises:
   participating in an auction held by the first advertising entity; and
   providing, on behalf of the given consumer, one or more bids to the first advertising entity.

31. The method as set forth in claim 29, wherein said step of negotiating an exchange comprises:
   conducting an auction on behalf of the given consumer; and
   receiving one or more bids from the first advertising entity.

32. The method as set forth in claim 29, further comprising steps of:
   receiving feedback data including data regarding a display of the first advertisement; and
   releasing at least one incentive in accordance with the first contract.

33. The method of claim 19 further comprising:
   distributing the first advertisement to a third destination device of the plurality of destination devices;
   receiving a second confirmation indication from the third destination device indicating that the first advertisement was viewed on the third destination device; and
   wherein initiating issuance of the credit amount based on the one of the plurality of first advertisement credits that corresponds to the first destination device further comprises initiating issuance of the credit amount based on the one of the plurality of first advertisement credits that corresponds to the first destination device and on a different one of the plurality of first advertisement credits that corresponds to the third destination device.

* * * * *